United States Patent
Granig

[11] 3,801,156
[45] Apr. 2, 1974

[54] SAFETY-BELT
[76] Inventor: Hubert Granig, Thomas-Schmid-Gasse 19,, 9020 Klagenfurt, Austria
[22] Filed: Nov. 15, 1971
[21] Appl. No.: 198,668

[52] U.S. Cl............................ 297/386, 280/150 AB
[51] Int. Cl............................ A47c 1/10, B60r 21/10
[58] Field of Search ............ 297/385, 386, 387, 388, 297/389, 390; 280/150; 2/2

[56] References Cited
UNITED STATES PATENTS

| | | | |
|---|---|---|---|
| 3,682,498 | 8/1972 | Rutzki | 280/150 |
| 3,481,626 | 12/1969 | Fergle | 280/150 |
| 3,690,695 | 9/1972 | Jones | 280/150 |
| 3,430,979 | 3/1969 | Terry et al. | 280/150 |
| 3,298,142 | 1/1967 | Isaac | 297/388 |
| 3,391,961 | 7/1968 | Gardner et al. | 297/388 |
| 3,623,768 | 11/1971 | Capener | 28/150 |
| 3,314,719 | 4/1967 | Johnson | 297/385 |
| 3,190,694 | 6/1965 | Isaac | 297/388 |

*Primary Examiner*—Paul R. Gilliam

[57] ABSTRACT

A safety belt which comprises at least one hollow body, at least one member containing expandable gas for blowing up the hollow body and including closure means, A device for releasing the blow-up in case of an accident. The hollow body has a plurality of exhaust openings for emergence from the hollow body within a shortest time period under the effect of the pressure exerted by the body of the belt user.

4 Claims, 6 Drawing Figures

FIG. 1 FIG. 2
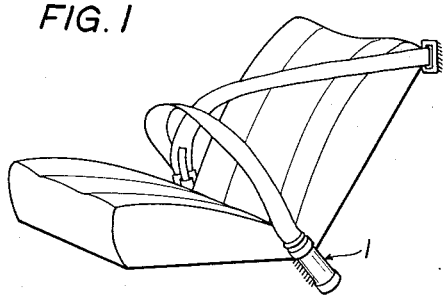
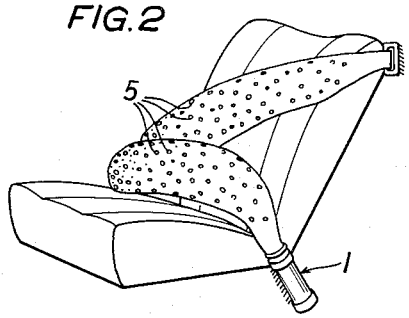
FIG. 3
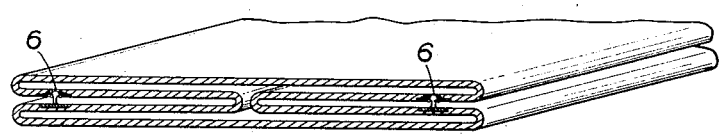
FIG. 4 FIG. 5
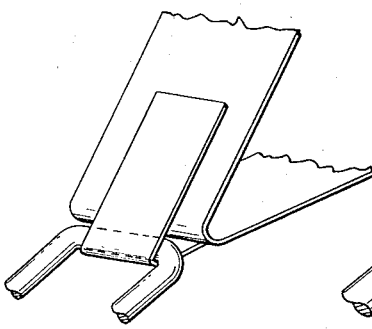
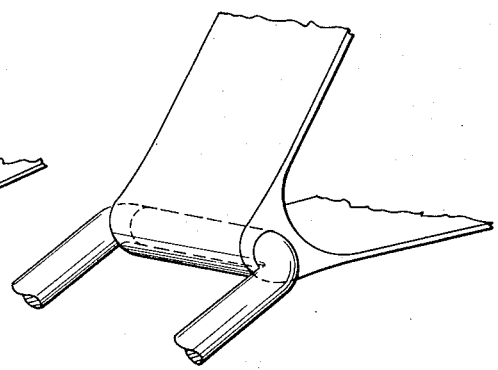
FIG. 6
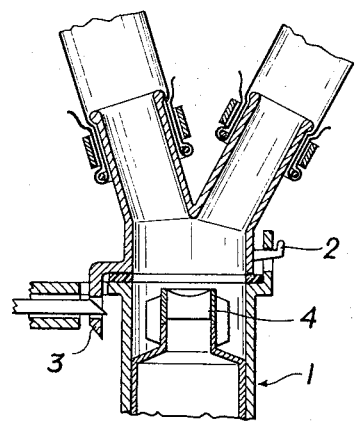

SAFETY-BELT

The present invention relates to a safety belt with one or a plurality of hollow bodies which are capable of being blown up by means of one or a plurality of pressurized air containers or ignitible cartridges, whereby the blowing up of each hollow body in case of an accident is released selectively, automatically or manually by bursting open of closures of the pressurized air container or by ignition of the cartridges, respectively.

Different embodiments of such belts are known which make possible in case of an accident a longer retarding path for the decelerating body. Such belts prevent also an impact of the vehicle occupants on the armature board or on the side walls and the roof of the automotive vehicle. General heavily weighing drawbacks are inherent, however, in the previously known safety belts. It is, due to the annoyance and movement prevention of the vehicle occupants connected therewith, not possible to make the belt selectively wide, in order to support a larger part of the body and to reduce the specific loads of the body- and belt-face.

Another heavily weighing drawback resides in known belts in the fact, that they must engage as much as possible close to the body, in order to be effective in case of a serious occasion. Also from this arrangement results a hindrance and annoyance of the vehicle riders, and this leads to the point, that belts which are provided in the vehicle, are not used.

Also safety belts, capable of being blown up, have been proposed. Thus U.S. Pat. No. 3,146,460 discloses a safety belt consisting of a plurality of hollow bodies, which are capable of being blown up at the moment of an accident. The drawback of this safety belt resides, however, in the fact, that it is resilient in the blown up state and thus the person falling into the belt is thrown back.

It is one object of the present invention, to provide a safety belt, which avoids the above stated drawbacks of the known structures, and which in particular prevents the resiliency in backward direction.

It is another object of the present invention, to provide a safety belt, wherein each of the hollow bodies has discharge openings, by example, perforations, through which the gas can be pressed out from the inner space of the hollow bodies, after being blown up under the effect of the pressure exerted by the body of the user of the belt within the shortest possible time, preferably within seconds or parts of seconds. By the energy consuming pressing out of gas from the belt, a slight catching of the body of the belt user is assured and any resiliency in backward direction is effectively prevented.

The hollow bodies of the safety belt, in accordance with the present invention, are made preferably of fabric.

In accordance with a further development of the concept of the present invention, it can also be provided, that the belt can be rolled together or is foldable in its empty state about its longitudinal axis and that for the securing of the belt in the rolled up or folded position closing devices in particular snap fasteners can be provided. By this arrangement the safety belt has in its non-blown up state, a width comparable with conventional belts and hardly hinders the person using the belt.

For an improved adjustment to the body contours, and for the protection of particularly endangered body parts of the person using the belt, the latter has within the scope of the present invention in its blown up state different cross sections along its longitudinal extension as widenings, bulges or narrow portions.

It can be provided within the scope of the present invention, that for the adjustment of the filling pressure of the belt to the vehicle speed, the number of the pressurized air containers to be released or the cartridges to be ignited is increased with rising vehicle speed.

Finally, in accordance with the present invention, for the prevention or reducing of secondary accident consequences, it is provided, that for the filling of the belt an expandable gas having medicinal or fire fighting characteristics is used or a medium capable of expsnsion with medicinal or fire fighting characteristics is added to the expanding gas.

With these and other objects in view which will become apparent in the following detailed description, the present invention, which is shown by example only, will be clearly understood in connection with the accompanying drawings, in which:

FIG. 1 is a perspective view of a three-point safety belt in its non-blown-up state;

FIG. 2 is a perspective view of the blown up safety belt;

FIG. 3 is a cross section of the hollow body of the belt;

FIGS. 4 and 5 are fragmentary perspective views of the buckling point of the safety belt; and FIG. 6 is a section of a three-point safety belt indicating another embodiment thereof.

Referring now to the drawing and in particular to FIG. 1, the shown therein has two hollow bodies and is connected to a cartridge or a pressurized air container 1, the filling of which as a gas can expand into the hollow body. Also pressurized air or pressurized gas fillings or ignitible powder or gas cartridges, and the like, respectively, can be used.

The safety belt has in view of its fabric characteristics and in view of the apertures or perforations 5, respectively, a predetermined capacity of passing through whereby the gas can be pressed out from the inner space of the hollow bodies by the body falling into it. The gas flows against the passage resistance of the openings or apertures of the hollow body, whereby labor is performed and moving energy is fed off to stop the body falling into it. These apertures are predetermined in size, number and/or arrangement to produce this effect.

The large hollow bodies of the blown up safety belts provide for the body to be retarded on a wide yielding engaging face of the belt, which supports itself mainly on the part of the belt opposite contiguous to the body, which belt transmits this force in turn to a belt anchoring (the latter known per se and not a part of the present invention).

The safety belt is blown up only at the moment of the accident. The release takes place either automatically by a known retarding indicator or a shock indicator on the inertia base or another device, respectively, as for instance a bow on the impact side of the vehicle or manually by an electrical switch. The release causes mechanically or electrically the opening of closures of the pressurized air container or ignition of the cartridge. The above-mentioned means are known per se and do not constitute a part of the present invention.

The ignition or opening device comprises an ignition capsule 4 (FIG. 6), which opens or rips open, respectively, the closure of the container by its own pressure or causes the same effect by the additionally created pressure, by example in pressurized gas containers, or by ignition of burnable parts of the container content.

As much as the closure of the safety belt as shown in FIG. 1 is not provided at the end of the belt over which the latter is blown up, conventional closure types can be used without changes, since the belt in its folded state has approximately the same measurements, as the already known belts. In FIG. 3 it is shown, how the folded state of the belt is maintained by snap fasteners 6.

A closure at the end of the belt, over which the latter is blown up, must be equipped for the purpose of filling with a circular, oval or rounded rectangular passage cross section. As shown in FIG. 6, two tongue closures or an immovable hook device combined with a tongue closure 3 are provided.

It is also possible to connect the fillihg container directly with the belt, whereby as a closure, any of the known constructions can be used. There must be merely considered the contacts for further feeding of the release impulse to the container. The abovementioned means are known per se and do not constitute a part of the present invention.

In order to adjust the efficiency of the safety belt to the speed at the time of the accident, it is possible to raise the filling pressure in case of higher speeds, by providing with increasing speeds a plurality of pressurized air containers or cartridges, respectively, for release. The control of the number can take place by means of the tachometer, by feeding the impulse emerging from the retardation indicator by means of a pointer on the tachometer, which feeds the impulse depending upon the speed of the vehicle, one or a plurality of contact devices for the release. The abovementioned means are known per se and do not constitute a part of the present invention.

By this variable feeding pressure and the resistance of the belt resulting therefrom, always the optimum retarding path for the body, which can be offered by the belt, is exploited. Of course, the same effect can also take place by one or a plurality of valves to be opened mechanically, whereby the control takes place in an analogous manner and way.

The essential advantages of the present safety belt are in their wide yielding engaging face for the body, furthermore the possibility of the vehicle riders to carry it loosely and still in case of emergency to have available by the blown up belt a comparatively tight fitting safety belt with a long retarding path.

Although not constituting part of the present invention, the gas used for the safety belt has preferably medicinal, and for fire fighting characteristics. It is, however, also possible to add to the gas means or ingridients having medicinal and/or fire fighting characteristics.

Such gases having fire fighting characteristics include preferably means which thin down the air and thereby prevent the spreading of a fire. Such means are particularly carbon dioxide, nitrogen and helium. Yet, also easily vaporizing, low halide-hydrocarbons (halones) can be used for this purpose. The three first mentioned gases can be applied simultaneously also for blowing up the safety belt, while halone must be added to a driving gas.

Concerning means having medicinal effects; it is provided to add such means in form of aerosol.

The following means having medicinal effects can be provided:

Ephedrine-1-phenyl-2-methyl-amino-1-propanol; against shock, increasing the circulation.

Adreson-cortisone-acetate-17-hydroxy-11-dehydrocorticoster-one-acetate; against shock, increasing the circulation.

Desoxy-adrenaline; against shock, increasing the circulation.

Noradrenaline; against shock, increasing the circulation.

N-ethyl-noradrenaline; against shock, increasing the circulation.

Prednisolone-1,4-pregnadiene-11($\beta$), 17($\alpha$), 21-triol-3,20-dione; against shock, increasing the circulation.

Largactil-N-(3'-dimethylamino)-propyl-3-chloro-phenothiazine; sedative.

Pentamethylentetrazol ( - Cardiazol) - pentamethylene tetrazol; coagulant.

Adrenochrome; coagulant.

Meperidine — ethyl-1-methyl-4-phenyl-4-piperidine carboxylate hydrochloride; pain killing.

1-methanol-methyl-propyl-phenyl hexahydride; revival from unconsciousness.

While I have disclosed one embodiment of the present invention, it is to be understood that this embodient is given by example only and not in a limiting sense.

I claim:

1. A safety belt for an occupant of a vehicle, comprising
   a vehicle safety belt formed at least of one hollow body and adapt—to be secured about the body of said occupant,
   means operatively connected to said hollow body whereby said hollow body is inflated substantially upon impact of said vehicle, and said hollow body having a plurality of exhaust apertures of predetermined size, number and arrangement for emergence from said hollow body of inflatable medium under the effect of the pressure exerted by the body of the occupant thereagainst.

2. The safety belt, as set forth in claim 1, wherein said hollow body is capable of being folded together about its longitudinal axis in its uninflated state, releasable closing means are provided in said hollow body for releasably securing said hollow body in said folded together state.

3. The safety belt, as set forth in claim 1, wherein said hollow body has in its inflated state different cross-sections along the length of said belt.

4. The safety belt, as set forth in claim 1, wherein said inflatable medium has fire fighting characteristics.

* * * * *